United States Patent [19]

Matsubayashi

[11] Patent Number: 4,956,894
[45] Date of Patent: Sep. 18, 1990

[54] APPARATUS FOR COLLECTING FISH EGGS

[75] Inventor: Kaneo Matsubayashi, Kishiwada, Japan

[73] Assignee: Toyo Suisan Kikai Co. Ltd., Osaka, Japan

[21] Appl. No.: 454,040

[22] Filed: Dec. 20, 1989

[51] Int. Cl.$^5$ ............................................. A22C 25/14
[52] U.S. Cl. ............................................ 17/58; 17/59; 17/63
[58] Field of Search .................. 17/58, 59, 60, 61, 63, 17/52

[56] References Cited

U.S. PATENT DOCUMENTS

| | | | |
|---|---|---|---|
| 3,670,363 | 6/1972 | Hogan et al. | 17/59 |
| 3,707,019 | 12/1972 | Wiggins | 17/58 |
| 3,754,301 | 8/1973 | Grimes | 17/58 |
| 3,793,675 | 2/1974 | Hogan et al. | 17/59 |
| 3,838,478 | 10/1974 | Wuluff | 17/59 |

FOREIGN PATENT DOCUMENTS 254038  1/1968  U.S.S.R. .................. 17/58

Primary Examiner—Willis Little
Attorney, Agent, or Firm—Larson and Taylor

[57] ABSTRACT

An apparatus for collecting fish eggs comprises a conveyor for transporting fish with the upper half of each fish inclined obliquely upward, a pair of upper and lower conveyor belts for holding the tail of each fish therebetween during transport, a pair of upper and lower conveyor belts for holding the trunk lower half portion of each fish therebetween during transport, trunk support portions and fish back restraining frames arranged alternately on the lower trunk holding belt, a head cutter disposed close to the terminal end of the conveyor, a member for pressing the abdomen of each fish after its head has been cut off, and an operating mechanism for the pressing member. During transport on the conveyor, the eggs in the abdominal cavity of each fish move toward the tail of the fish under gravity, and the head is thereafter cut off by the cutter. During the subsequent transport operation, the fish has its abdomen pressed by the member, is bent rearward about the portion thereof held by the trunk holding belts and is prevented from being further bent by the restraining frame in bearing contact with the back of the fish. The member therefore fully exerts its pressure on the fish to completely squeeze out the eggs from the head cut-off face for collection.

4 Claims, 9 Drawing Sheets

APPARATUS FOR COLLECTING FISH EGGS

BACKGROUND OF THE INVENTION

The present invention relates to improvements in apparatus for collecting fish eggs.

Conventionally, fish eggs were collected from the bodies of fishes such as walleye pollack primarily by manual work. Since the manual work is very inefficient, apparatus have been developed in recent years for mechanically collecting fish eggs.

Apparatus heretofore known for collecting fish eggs include, for example, the one disclosed in Examined Japanese Patent Publication No. 26257/1984.

The disclosed apparatus comprises a conveyor for transporting fish thereon with their abdomens directed toward the direction of advance of the conveyor and with the tails held to the conveyor, and egg removing spatulas arranged along the path of transport of fish horizontally pivotally movably and each biased by a spring toward the abdominal side of the fish. With the advance of the fish, the spatula slidingly moves relative to the fish toward its head in contact with the abdomen, whereby fish egges are pushed out from the abdominal cavity of the fish toward its head.

However, the apparatus has the problem that when coming into contact with the fish, the spatula merely slides along in contact with the abdomen of the fish if the spring force is weak, almost failing to remove the fish eggs from the abdominal cavity. Another problem is also encountered in that if the spring has an excessive force, the fish will be bent rearward to escape under great pressure of the spatula, with the result that the spatula fails to fully engage in the abdomen and to force out the eggs efficiently.

With the above apparatus, therefore, the spatula is disposed at more than one location along the conveyor to ensure reliable collection of fish eggs. This arrangement makes the apparatus large-sized, necessitating a large space for the installation of the apparatus. Moreover, collection of fish eggs at the plurality of locations entails the problem of a reduced collection efficiency.

Further with the above apparatus, the spatulas are arranged at the specified positions, while fish are transported in different positions. The spatula therefore not infrequently comes into contact with the midportion of the abdomen of the fish, collapsing many eggs to impair the commercial value of the product and encountering difficulty in collecting fish eggs.

SUMMARY OF THE INVENTION

An object of the present invention is to overcome the foregoing problems of the conventional apparatus.

Another object of the invention is to provide a fish egg collecting apparatus wherein the fish eggs in the abdominal cavity of fish are allowed to move toward the tail under gravity during the first half of a fish transport process by a conveyor and are thereby prevented from being cut when the head is subsequently cut off, the apparatus thus being adapted to collect fish eggs of good quality properly free of damage.

Another object of the invention is to provide a fish egg collecting apparatus wherein fish are transportable each with the head held in a specified position so that the head can be cut off accurately as held in the specified position to fulfill the above objects with greater reliability.

Still another object of the invention is to provide an apparatus which comprises a press member for pressing the abdomen of fish to force out the fish eggs form the abdominal cavity, and a restraining frame for receiving the back of the fish as bent rearward by the pressure to restrain the fish from bending further rearward, permitting the press member to exerts its pressure effectively so that the fish eggs can be pushed out from the abdominal cavity completely reliably.

The present invention provides an apparatus for collecting fish eggs which comprises a main endless conveyor for transporting fish with the head of each fish positioned in place and also with the upper half of the fish inclined upward, a pair of upper and lower tail holding endless conveyor belts for holding the tail of each fish therebetween during transport, a pair of upper and lower trunk holding endless conveyor belts disposed between the main endless conveyor and the pair of conveyor belts for holding therebetween the trunk lower half portion of each fish between the abdomen and the tail during transport, trunk support portions and fish back restraining frames arranged alternately on the lower trunk holding endless conveyor belt, a cutter for cutting off the head of each fish during transport, a press member adapted to come into contact with the anal portion of each fish after the head has been cut off, and a press member operating mechanism for moving the press member along a fish back bearing face of each restraining frame approximately in parallel thereto as each fish is tranported.

When fish are placed on the main endless conveyor of the above apparatus each with the abdomen directed toward the direction of transport of fish, the upper half of each fish is positioned as inclined upward, so that the fish eggs in the abdominal cavity move toward the tail under gravity. The head of the fish is always accurately positioned on a head support on the main conveyor with the gill cover thereof engaged by a gill cover engaging frame on the main conveyor, so that the head can be cut off accurately without partly cutting the mass of fish eggs.

When each fish is further transported with its tail and the trunk lower half portion held between the respective pairs of endless conveyor belts after the head has been cut off, the abdomen of the fish is brought approximately at its anal portion into contact with the press member which is disposed at an intermediate location of path of transport of fish. As the fish is further transported, the upper half portion of its body is prevented from moving by the press member, so that the upper half portion is bent rearward with the lower half portion of the fish body held between the trunk holding belts.

When the fish upper half portion is thus bent, the back of the fish is pressed against and restrained by the restraining frame attached to the side edge of the lower trunk holding belt, whereby the fish is prevented from further bending. Consequently, the body of the fish is pressed from the anal portion toward the head cut-off side by the press member which moves relative to the restraining frame as spaced apart from the back bearing face thereof at a constant distance corresponding to the thickness of the fish meat along the back. The fish eggs in the abdominal cavity are therefore squeezed out from the head cut-off face.

According to the invention, the head of fish can be cut off accurately always at the specified position without any likelihood of partially cutting the mass of eggs.

This results in the advantage that fish eggs of good quality can be reliably collected at all times free of damage.

Further according to the invention, the back of the fish bent by the pressure of the press member is supported by the restraining frame, whereby the bending of the fish body can be restricted to a definite limit. This leads to another advantage that the pressure of the press member can be exerted on the fish effectively to completely collect the fish eggs reliably.

BRIEF DESCRIPTION OF THE DRAWINGS

The drawings show a preferred embodiment of the present invention.

DESCRIPTION OF THE PREFERRED EMBODIMENT

Figure 1:
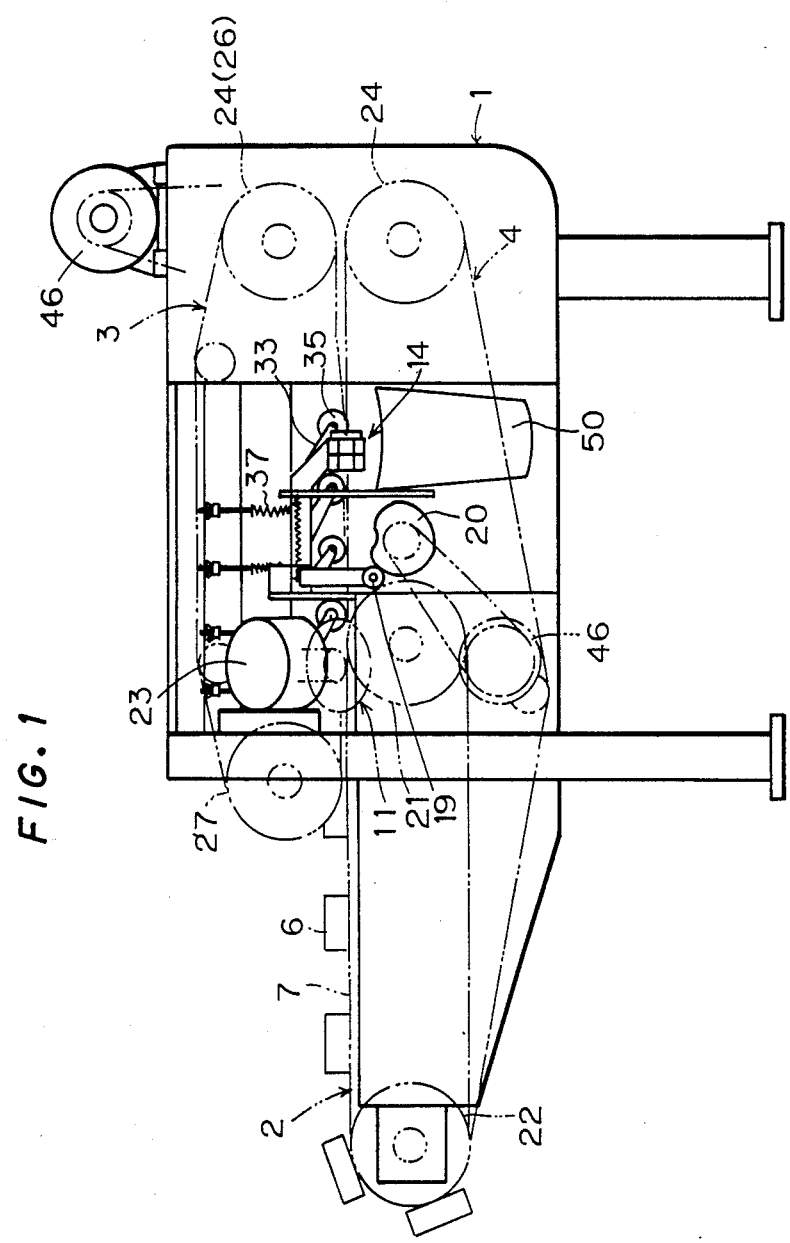
FIG. 1 is a side elevation.
Figure 2:
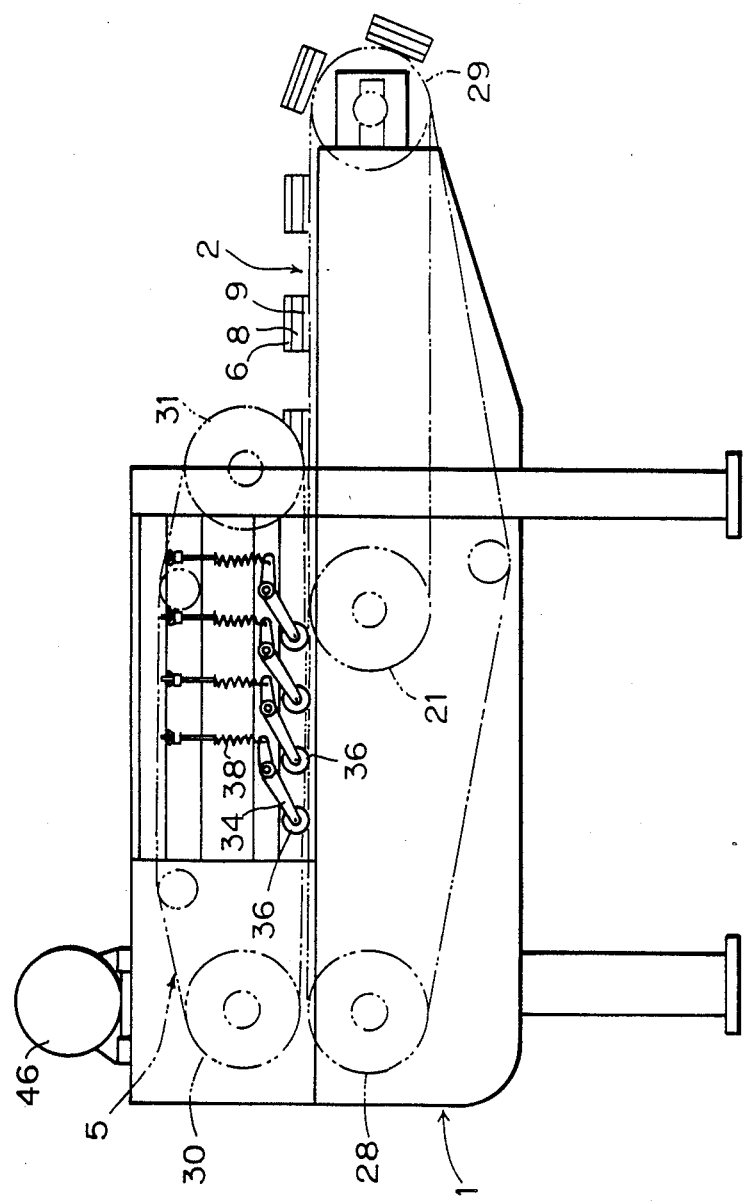
FIG. 2 is a side elevation as the embodiment is seen from the opposite side to FIG. 1.

The apparatus of the present invention for collecting fish eggs generally comprises a machine base 1, a main endless conveyor 2 for transporting fish in a horizontal direction with the abdomen c of each fish directed forward, a pair of upper and lower trunk holding endless conveyor belts 3, 4 arranged in parallel to the conveyor 2 for holding therebetween the trunk lower half portion d of each fish between the abdomen c and the tail e during transport, a pair of upper and lower tail holding endless conveyor belts 5, 5 arranged in parallel to the belts 3, 4 for holding the tail e of each fish a during transport, a head cutter 11 disposed in the vicinity of the conveyor 2, frames 12 for restraining the back g of each fish, a press member 14 disposed to the front of the cutter 11, and a mechanism 17 for operating the press member 14.

Figure 3:
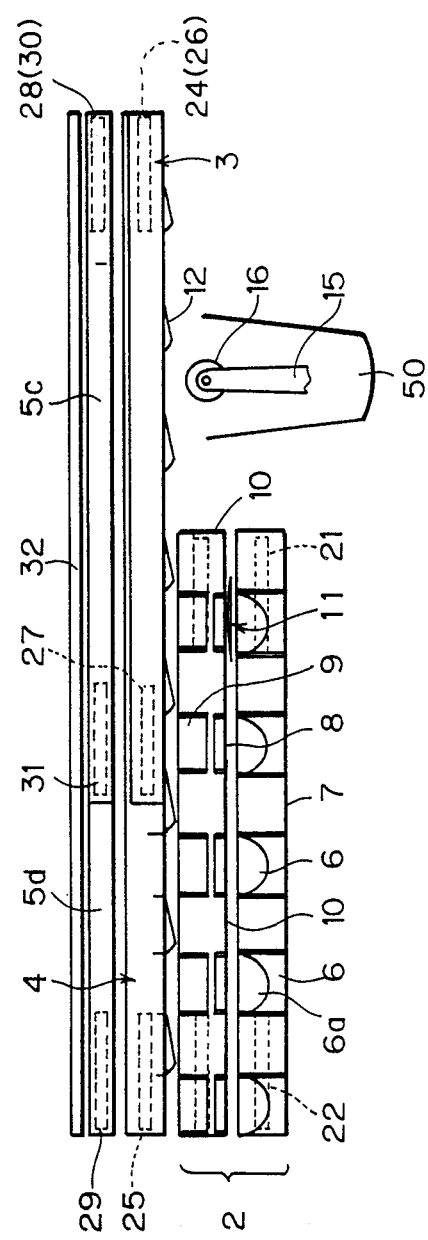
FIG. 3 is a schematic plan view.
Figure 4:
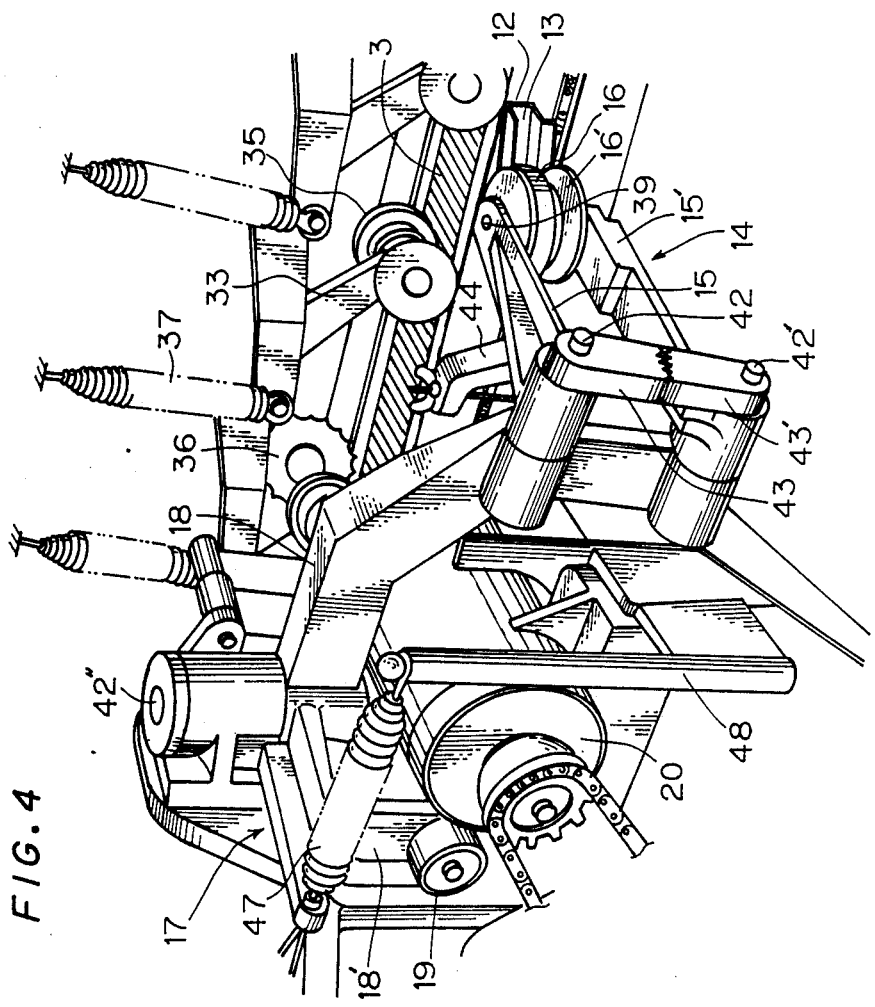
FIG. 4 is a fragmentary perspective view.
Figure 8:
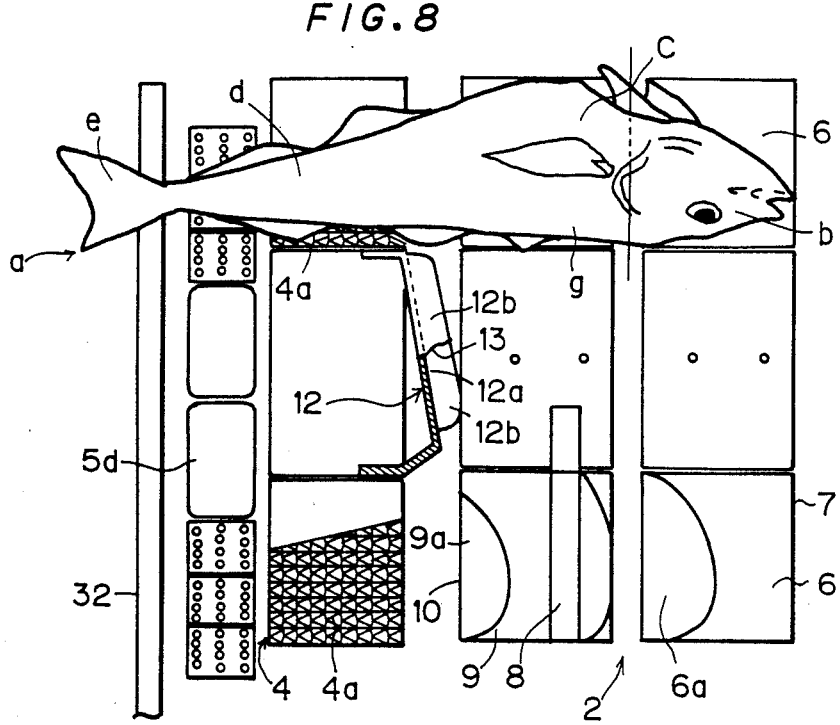
FIG. 8 is a plan view showing a fish as placed on the embodiment during transport.

With reference to FIGS. 3 and 8, the main endless conveyor 2 comprises an endless belt 7 having a multiplicity of head supports 6 arranged at a predetermined spacing for placing thereon the heads b of respective fish, and an endless belt 10 provided as arranged at a specified spacing with a multiplicity of engaging frames 8 each for engaging the gill cover f of the fish a and a multiplicity of abdomen supports 9. The endless conveyor 2 is reeved around drive wheels 21 at the starting end of the transport of fish a, i.e., at the rear end of the machine base 1, and around the driven wheels 22 at the midportion of the base 1.

Figure 9:
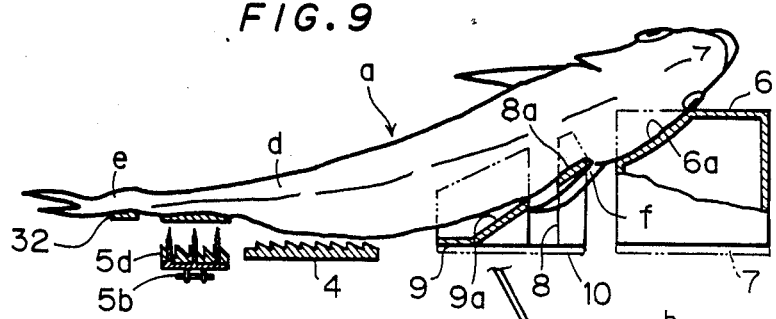
FIG. 9 is a schematic front view in vertical section of FIG. 8.
Figure 10:
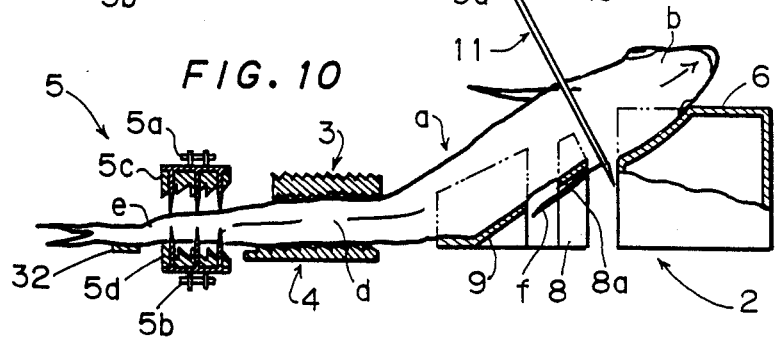
FIG. 10 is a schematic front view in vertical section showing the fish when the head is cut.

With reference to FIGS. 8 to 10, the head support 6, the gill cover engaging frame 8 and the abdomen support 9 respectively have on their upper side an inwardly curved head support portion 6a for one side of head b of fish to rest thereon, an inwardly curved gill cover engaging portion 8a engageable in the gill opening of fish, and an inwardly curved abdomen support portion 9a for one side of the abdomen of fish to rest thereon. These portions 6a, 8a and 9a are arranged in a row transversely of the apparatus and gently inclined downward from the head support 6 toward the abdomen support 9, whereby the upper half portion of the fish a can be supported as inclined upward toward its head e.

The upper edge of the gill cover engaging portion 8a is at a slightly higher level than the lower edge, opposed thereto, of the head support portion 6a so as to engage the lower-side gill cover f of the fish a readily and reliably.

Of the pair of upper and lower trunk holding belts 3, 4, the lower belt 4 extends over the entire length of the machine base 1 and is reeved around a drive pulley 24 and a driven pulley 25 endlessly. The upper holding belt 3 extends from a position slightly rearward from the position of the cutter 11 to the terminal end of transport (front end of base 1) and is reeved around a driven pulley 27 and a drive pulley 26 endlessly. The lower belt 4 is provided with trunk support portions 4a for supporting the trunk lower half portions of fish. These support portions 4a are arranged at the same spacing as the head supports 6 on the main endless conveyor 2 and are each movable along with the head support 6, engaging frame 8 and abdomen support 9 in alignment therewith transversely of the apparatus.

The upper and lower tail holding endless conveyor belts 5, 5 respectively comprise upper and lower endless chains 5a, 5b and belts 5c, 5d of reduced width attached to the chain over the entire length thereof and carrying pins. The lower endless chain 5b extends over the entire length of the machine base 1 like the lower holding belt 4 and is reeved around a drive sprocket wheel 28 and a driven sprocket wheel 29. The upper endless chain 5a extends from a position slightly rearward from the position of the cutter 11 to the terminal end of transport (front end of base 1) and is reeved around a driven sprocket wheel 31 and a drive sprocket wheel 30 endlessly. A guide 32 for the tail e of the fish a is provided on one side edge of the machine base 1 in parallel to the lower belt 5d.

The upper trunk holding belt 3 is pressed against the lower trunk holding belt 4 oppoesed thereto by pressure rollers 35 each rotatably supported by the lower end of a bent lever 33 pivoted at an intermediate portion thereof to the machine base 1. Similarly, the upper endless chain 5a for holding the tail e is pressed against the lower pin-carrying belt 5d opposed thereto by pressure wheels 36 each rotatably supported by the lower end of a bent lever 34 pivoted at an intermediate portion thereof to the machine base 1. The pressure of each roller 35 or wheel 36 is controllable by adjusting the tensile force of a coiled spring 37 (38) attached to and extending between the base of the lever 33 (34) and the machine base 1.

The cutter 11, which is in the form of a disk, for cutting off the heads b of fish a is driven by a motor 23 mounted on the base 1 and has a cutting blade which is positionable in a clearance between the head support 6 and the gill cover engaging frame 8 obliquely perpendicular to the head support portion 6a.

Each fish back restraining frame 12 is fixed to the lower trunk holding belt 4 on one side thereof adjacent to the endless belt 10 and positioned between the adjacent trunk support portions 4a, 4a of the belt 4. Accordingly, the trunk support portions 4a and the back restraining frames 12 arranged alternately on the belt longitudinally thereof.

The back restraining frame 12 is made of a metal plate of specified width and has at its front and rear ends bent portions fixed to the above-mentioned side of the belt 10 of the conveyor 10. The frame 12 has a rectangular back bearing-vertical portion (face) 12a of specified height (width) extending from the front end to the rear end and inclined toward the belt 10 at a small angle. The vertical portion 12a is formed with pieces 12b, 12b having a predetermined width and integrally projecting from the upper and lower edges thereof, respectively, horizontally toward the belt 10 to define a groove 13 for the back g of the fish a to fit in.

With reference to FIGS. 4 to 7, the press member 14 comprises a pair of upper and lower disklike press rolls 16, 16' rotatably supported by a vertical pin 39 on the forward ends of a pair of upper and lower arms 15, 15', respectively, and pressed into contact with each other movably toward or away from each other in vertical direction. Each of the rolls 16, 16' has an outer peripheral pressing face which is circular-arc in cross section. The arm 15, 15' extend from one side of the machine base 1 inwardly thereof horizontally so as to position the press rolls 16, 16' at a constant distance from the back bearing face 12a of the restraining frame 12 on the lower trunk holding belt 4 during the travel thereof.

Figure 5:
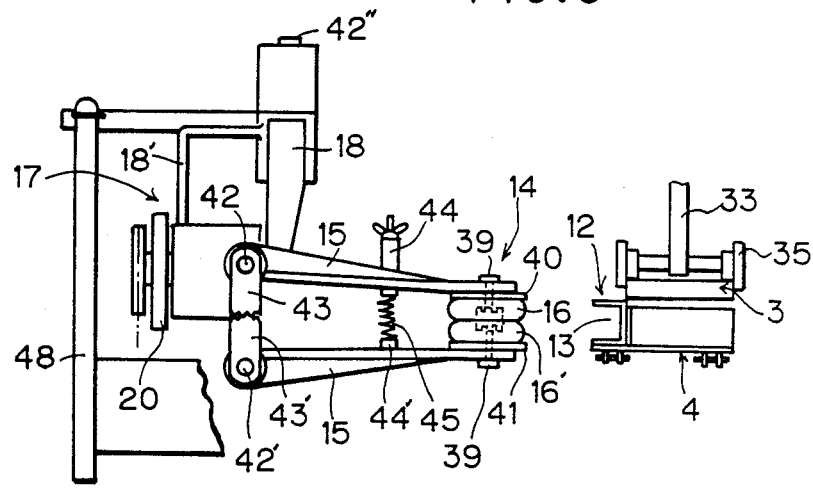
FIG. 5 is a fragmentary front view.
Figure 6:
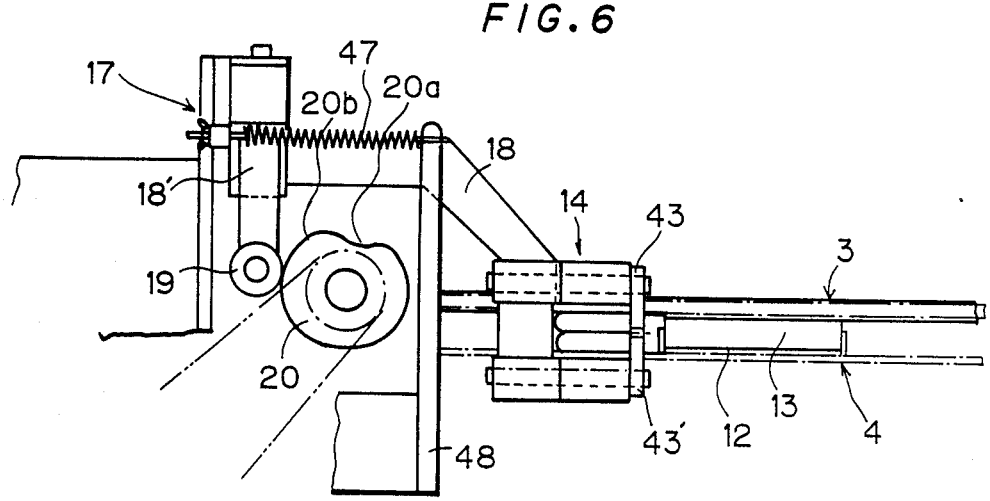
FIG. 6 is a fragmentary side elevation.

As seen in FIG. 5, the upper side of the upper press roll 16 and the lower side of the lower press roll 16' are coaxially provided with abdomen guide plates 40, 41, respectively, which are each in the form of an ellipse having a minor axis smaller than the roll diameter and a major axis larger than the roll diameter.

The upper and lower press rolls 16, 16' are shiftable longitudinally of the arms 15, 15', respectively, for the adjustment of the distance between the roll and the bearing face 12a of the frame 12.

The pair of arms 15, 15' are vertically movably supported at their base ends by respective lateral pivots 42, 42' on a vertical frame portion of a bent pivotal frame 18 which is a component of the operating mechanism 17 for the press member 14. Segment gears 43, 43' secured to the base ends of the respective arms 15, 15' are in mesh with each other to render the upper and lower press rolls 16, 16' movable upward and downward away from each other at the same time by the same distance from the plane of pressing contact between the rolls. A spring 45 provided between spring holders 44, 44' secured to the respective arms 15, 15' each at its midportion is adjustable in its tensile force, whereby the rolls 16, 16' are pressed against each other with a great force in the usual state.

The pivotal frame 18 of the operating mechanism 17 has its base end horizontally rotatably supported by a vertical pivot 42" on the machine base 1. A roller 19 is rotatably mounted on the lower end of an L-shaped branch bar 18' projecting from the base end of the frame 18 perpendicular thereto. The roller 19 is slidably in pressing contact with the cam face of an elliptical cam plate 20 which is rotatable at a constant peripheral speed by a motor 46 through a suitable transmission.

The main endless conveyor 2, the tail holding endless conveyor belts 5 and the trunk holding endless conveyor belts 3, 4 are driven in operative relation with one another by the motor 46 through a suitable transmission so as to rotate the cam plate 20 in synchronism with these conveyor means.

A spring 47 extending from the branch bar 18' to a rod 48 projecting upright from the machine base 1 is adjustable in tension to control the contact pressure of the roller 19 on the cam face.

The cam plate 20 has along its outer periphery a recessed arcuate face 20a for projecting the press rolls 16, 16' into pressing contact with the anal portion of the fish a sent forward upon the roller 19 reaching the face 20a. The cam plate 20 further guides the roller 19 onto an outwardly curved arcuate face 20b extending from the recessed arcuate face 20 and positioned a larger distance away from the center of the cam plate than the face 20, slightly retracting the press rolls 16, 16' gradually so as to maintain the press rolls 16, 16' at a definte distance from the restraining frame 12 and to project the rolls again after the rolls have moved past the frame 12.

Figure 7:
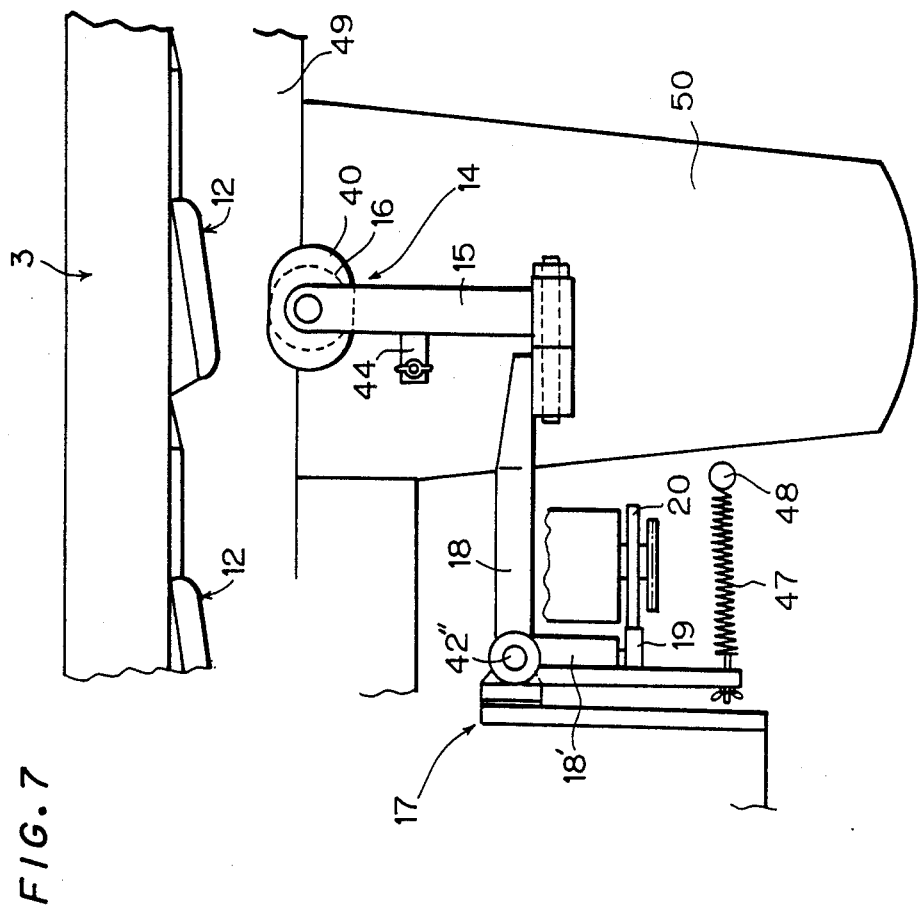
FIG. 7 is a fragmentary plan view.

FIG. 7 shows a fixed horizontal plate 49 extending under the press member 14 alongside the lower trunk holding belt 3 and having one end close to the terminal end of the endless belt 10 of the conveyor 2.

Further indicated at 50 is a chute extending from a position below the press member 14 toward the outside of the apparatus and inclined downward.

A description will be given of the operation of the apparatus embodying the invention and having the above construction for collecting fish eggs.

First, the motors 23 and 46 are operated to rotate the head cutter 11 and drive the endless conveyor 2, the tail holding endless conveyor belts 5 and the trunk holding endless conveyor belts 3, 4.

Next, at the fish transport starting position at the rear end of the machine base 1, walleye pollack or like fish a are manually fed to the conveyor 2 and the belt 4 by placing the head b and abdomen c of each fish a on the supports 6 and 9, respectively, while directing the abdomen c toward the direction of transport and engaging the gill cover f with the upper edge of the engaging portion 8a of the frame 8 (FIGS. 8 and 9).

Fish a are thus fed successively for the respective lateral rows of fish support portions arranged at the specified spacing. Since each fish a fed has its upper half portion inclined upward which portion includes the head b and the abdomen c, the fish eggs in the abdominal cavity move toward the tail under gravity.

The fish a thus fed to the conveyor 2 is transported forward. During the transport, the trunk lower half portion d and the tail e are held by the pair of upper and lower belts 3, 4 and the pair of upper and lower pin-carrying belts 5c, 5d, respectively. In this state, the fish is fed to the cutter 11 and has its head b cut off (FIG. 10), whereupon the cut-off head b falls into a container under the machine base 1.

Figure 11:
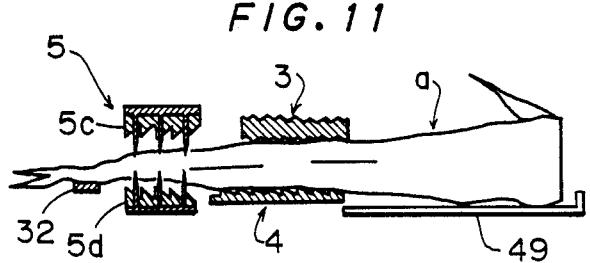
FIG. 11 is a schematic front view in vertical section showing the fish after the head has been cut off.
Figure 12:
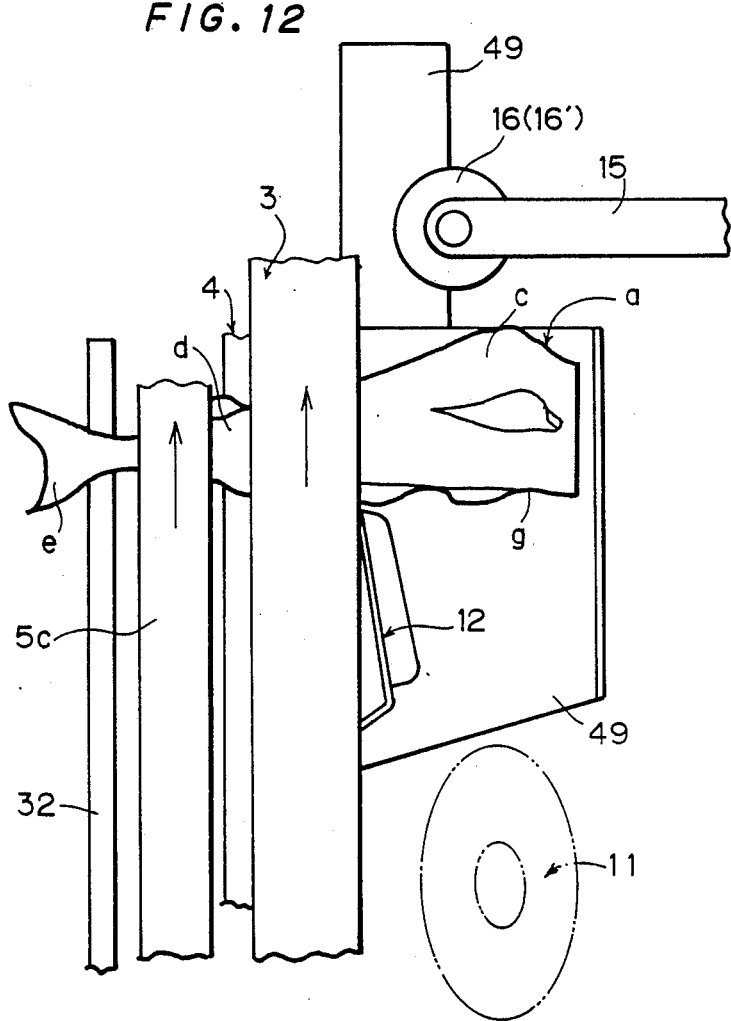
FIGS. 12 to 14 are plan views for illustrating how to collect the fish eggas from the fish.

Upon the passage of the fish a through the position of the cutter 11, the conveyor 2 is turned downward and reversed, permitting the abdomen c of the fish a to be received by the fixed horizontal plate 49 (FIGS. 11 and 12). At the same time, the lower end of the abdomen (anal portion) is brought into contact with the press rolls 16, 16' of the press member 14.

As already described, the press rolls 16, 16' are rotatably mounted on the forward ends of the respective upper and lower arms 15, 15', and the arm carrying pivotal frame 18 of the operating mechanism 17 is reciprocatingly pivotally moved horizontally by the roller 19 in sliding contact with the cam face of the cam plate 20 in rotation, whereby the press rolls 16, 16' are moved toward and away from the side face of the endless belt 10 opposed thereto, in timed relation with the transport of the fish a.

Figure 13:
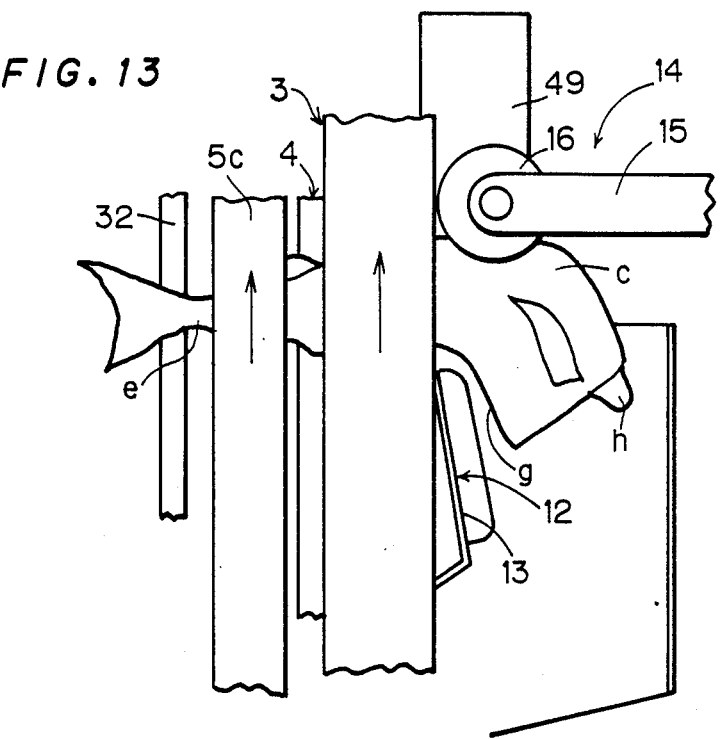

When the abdomen c of the fish a comes into contact with the press rolls 16, 16', the fish a is prevented from advancing by these rolls 16, 16', with the result that the abdomen c is bent rearward about the trunk lower half portion d which is held by the upper and lower holding belts 3, 4, as this portion d further moves forward (FIG. 13).

When the abdomen c is thus bent rearward by being pressed by the press rolls 16, 16', the back g of the fish a is forced into the fitting groove 13 of the restraining frame 12 attached to the side edge of the lower trunk holding belt 4 and brought into contact with and restrained by the vertical bearing face 12a.

In this state, the distance between the vertical bearing face 12a and the press rolls 16, 16' is equal to the thickness of means between the abdominal cavity of the fish a and the back thereof (about 25 mm), and the press rolls 16, 16' are engaged in the anal portion of the fish a.

Figure 14:
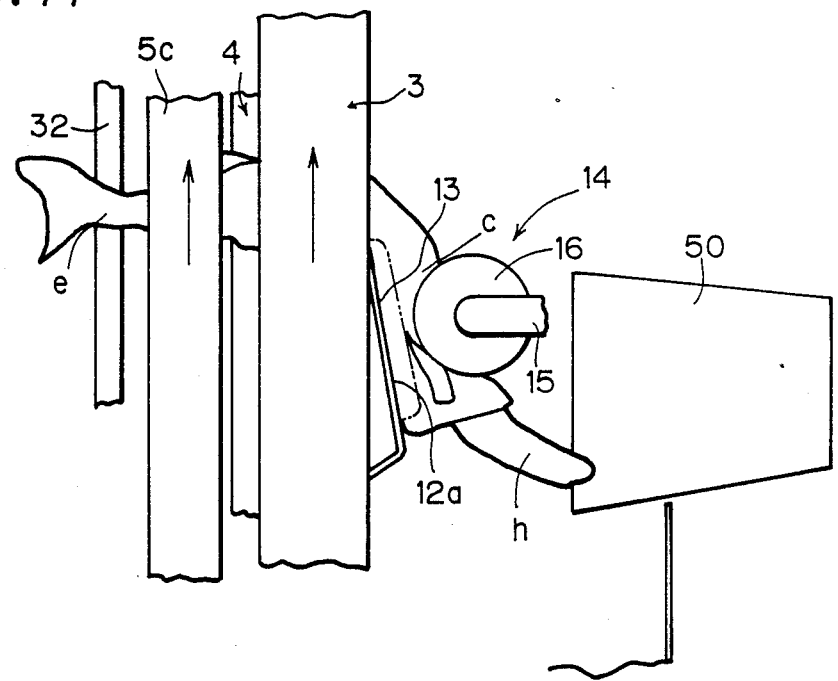

With the tensile force of the spring 47 acting on the press rolls 16, 16' through the pivotal frame 18, the abdomen c of the fish a is pressed by the rolls 16, 16' from the anal portion toward the head cut-off side as the fish a is transported forward from the above state, whereby the fish eggs h in the abdominal cavity are squeezed out from the head cut-off face (FIG. 14).

The press rolls 16, 16', arranged one above the other and each having a peripheral pressing surface which is circular-arc in cross section, act to squeeze out the fish egges h from the abdomen c as by pinching between the index finger and the thumb, and the pressure acting between the press rolls 16, 16' and corresponding to the pinching force is adjustable by controlling the force of the spring 45.

In this way, fish eggs h are successively and automatically squeezed out from the respective fish a sent foward one after another. The removed eggs h fall onto the chute 50 and are collected in a suitable container (not shown) disposed below the chute 50.

Although a preferred embodiment of the invention has been described above, the embodiment is given for illustrative purposes only and in no way limits the invention. Accordingly, various modifications and alterations of the present apparatus are all included in the present invention insofar as they do not depart from the scope of the invention as defined in the appended claims.

What is claimed is:

1. An apparatus for collecting fish eggs comprising a main endless conveyor for transporting fish with the head of each fish positioned in place and also with the upper half of the fish inclined upward, a pair of upper and lower tail holding endless conveyor belts for holding the tail of each fish therebetween during transport, a pair of upper and lower trunk holding endless conveyor belts disposed between the main endless conveyor and the pair of conveyor belts for holding therebetween the trunk lower half portion of each fish between the abdomen and the tail during transport, trunk support portions and fish back restraining frames arranged alternately on the lower trunk holding endless conveyor belt, a cutter for cutting off the head of each fish during transport, a press member adapted to come into contact with the anal portion of each fish after the head has been cut off, and a press member operating mechanism for moving the press member along a fish back bearing face of each restraining frame approximately in parallel thereto as each fish is transported.

2. An apparatus as defined in claim 1 wherein the main endless conveyor comprises an endless belt having a plurality of head supports arranged at a predetermined spacing for placing thereon the heads of respective fish as inclined upward, and an endless belt provided as arranged at a specified spacing with a plurality of engaging frames each for engaging the gill cover of each fish to position the head in place and with a plurality of abdomen supports each having a surface sloping downward toward the tail of the fish to be transported, and the head supports, the engaging frames and the abdomen supports being alinged in respective transverse rows intersecting the direction of transport of fish at right angles therewith.

3. An apparatus as defined in claim 1 wherein the press member comprises a pair of upper and lower arms coupled to each other at their base ends by a pair of segment gears meshing with each other, the arms being biased toward each other by a spring, and a pair of disk-like rolls rotatably mounted on the forward ends of the respective arms and each having an outer peripheral face circular-arc in cross section and adapted for pressing contact with the abdomen of the fish.

4. An apparatus as defined in claim 1 wherein the press member operating mechanism comprises a pivotal frame supporting the base ends of the pair of arms individually pivotally movably upward and downward, a vertical pivot supporting the base end of the pivotal frame on the base of the apparatus horizontally rotatably, and a rotary cam for moving the pivotal frame toward or away from the fish back bearing face of the restraining frame.

* * * * *